R. QUIJANO.
FIBER CLEANING DEVICE.
APPLICATION FILED AUG. 8, 1919.

1,336,046.

Patented Apr. 6, 1920.
2 SHEETS—SHEET 1.

Inventor
Ramon Quijano
by Byrnes Townsend & Pickard
Attorneys

R. QUIJANO.
FIBER CLEANING DEVICE.
APPLICATION FILED AUG. 8, 1919.
1,336,046.
Patented Apr. 6, 1920.
2 SHEETS—SHEET 2.
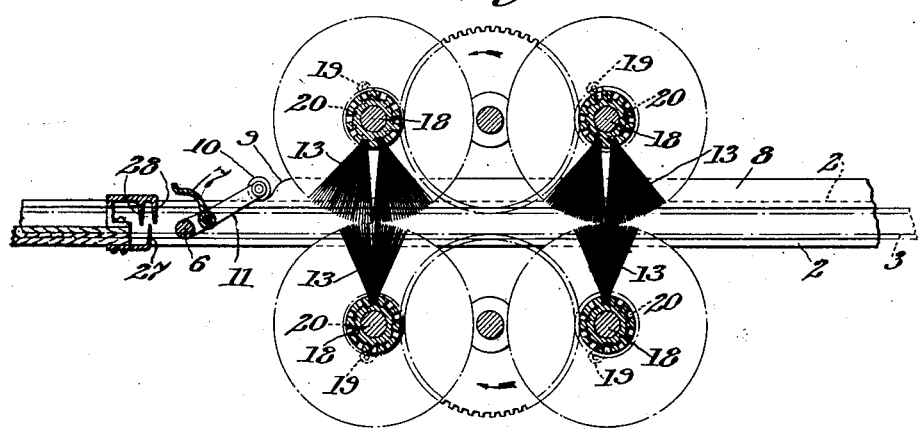
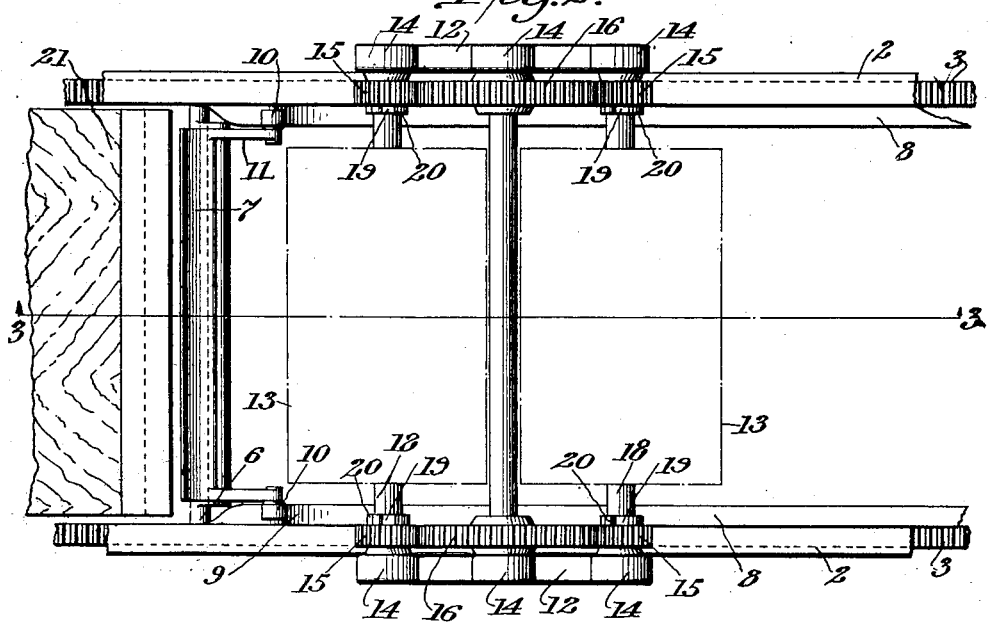
Inventor
Ramon Quijano
By Byrnes Townsend & Brokenstein
Attorneys

UNITED STATES PATENT OFFICE.

RAMON QUIJANO, OF SAN ANTONIO, TEXAS.

FIBER-CLEANING DEVICE.

1,336,046.  Specification of Letters Patent.  Patented Apr. 6, 1920.

Application filed August 8, 1919. Serial No. 316,259.

*To all whom it may concern:*

Be it known that I, RAMON QUIJANO, a citizen of the Republic of Mexico, residing at San Antonio, in the county of Bexar and State of Texas, have invented certain new and useful Improvements in Fiber-Cleaning Devices, of which the following is a specification.

This invention relates to the recovery of commercial fibers from certain varieties of fleshy plants, more especially wild plants such as grow in Mexico, including the agave, lechuguilla, tula, jaumave, sisal, aloe and pita; henequen, teguilla, sotol and maguey; guapilla or huapilla; palma, palma-pita, palmilla and palmetto.

It is the principal object of the invention to provide an apparatus for expeditiously removing from the leaves of such plants the outer fleshy or non-fibrous tissues covering the fibers.

The apparatus embodying the invention consists primarily of cleaning mechanism operating upon opposite sides of the leaves and means for drawing the leaves past said cleaning mechanism.

In its more specific aspect, the invention consists of revoluble, drum-shaped or cylindrical devices, preferably brushes, adapted to operate upon opposite sides of the leaves, clutch mechanism adapted to grip the leaves, mechanism for reciprocating the clutch mechanism through the space intermediate the said devices and means for automatically opening the clutch mechanism at both ends of a stroke, to receive and release the leaves respectively.

For a fuller understanding of the invention reference is had to the accompanying drawings in which—

Fig. 2 is a plan view of the principal portion thereof;

Fig. 3 is a longitudinal vertical section taken on the line 3—3, of Fig. 2; and

Figure 1:
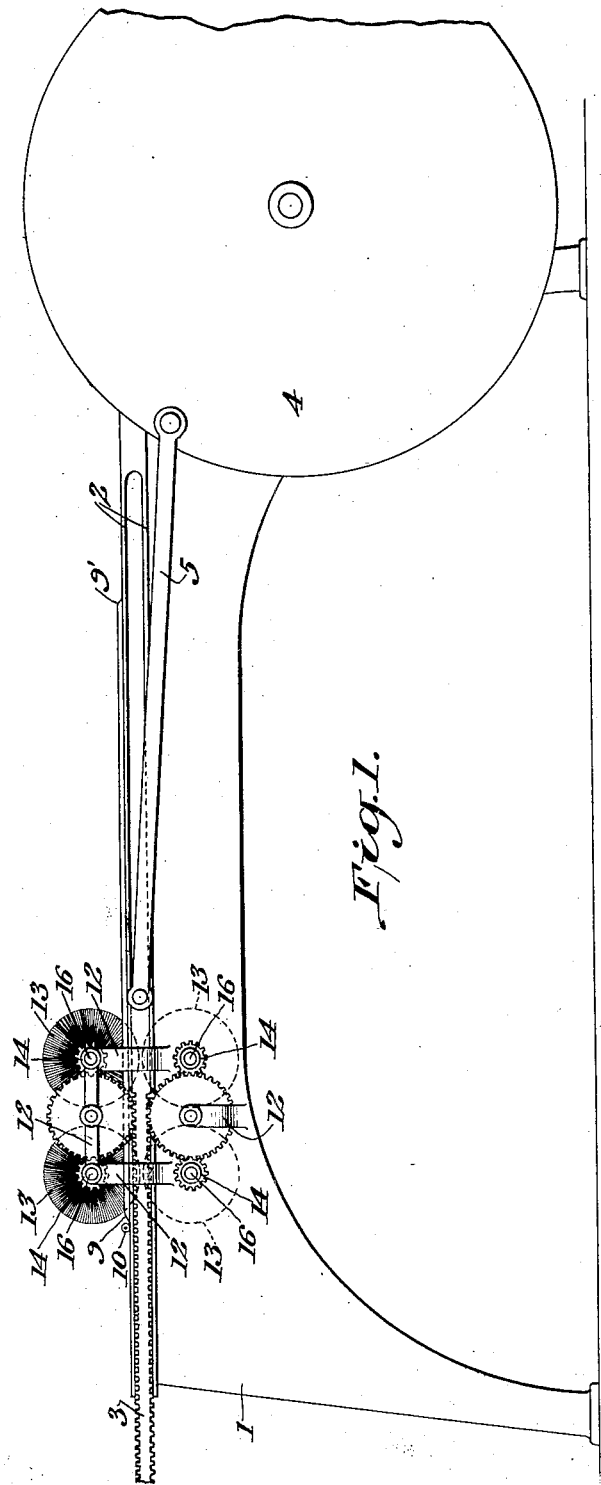
Figure 1 is a side elevation of an apparatus embodying the invention.

In the drawings 1 represents the support for the operating mechanism. The upper portion of the support carries parallel guide rails 2 for racks 3 which are connected to a reciprocating mechanism. In the drawings I have indicated for this purpose a conventional crank disk 4 and a pitman 5 pivotally connected to each of the racks 3.

At their free end the racks carry a clutch mechanism consisting, in the particular embodiment shown, of a fixed clutch element 6 interconnecting the racks 2 and a movable clutch element 7. For a purpose to be more fully explained I have made provision for opening the clutch elements at the ends of the stroke and for keeping them in closing position during the movement intermediate the ends of the stroke. There is, of course, considerable latitude in the selection of means for accomplishing this purpose. As a simple means I have indicated a cam bar 8 connected to the rails 2. This cam bar has cam shoulders 9 and 9' at its opposite ends to coöperate with rollers 10 projecting laterally from levers 11 which form part of the movable clutch element 7 and extend from its opposite ends.

In the position indicated in Fig. 3 the rack is shown in its extreme position in its movement away from the reciprocating device. The rollers have passed down the shoulders 9 and the clutch is in open position. At the beginning of the return stroke the rollers ascend the shoulders 9 and force the clutch element 7 to closing position in which it remains until the opposite cam shoulders 9' are reached, when the rollers in sliding down these shoulders 9' force the clutch element 7 to open again. It is understood that by suitable spring mechanism, which has been omitted for the sake of simplicity, the clutch may be opened more positively.

On the support 1 are mounted in a suitable frame 12 brushes 13 disposed to operate upon opposite sides of the leaves. I refer to brushes merely as the preferred form of cleaning device for the particular purpose. It is understood that other forms of drum-shaped or cylindrical devices may be used for operating upon the leaves to cause abrasion or attrition in any form.

The brushes 13 are mounted in bearings 14 and carry near their ends pinions 15. On the frame 12 is also mounted suitable gearing including gears 16 for imparting motion to the brushes through the pinions 15. The gears 16, of which there are two at each end of the brushes, are in mesh with the upper and lower teeth of the racks 3, respectively, as indicated in Fig. 1. The pinions are loosely mounted upon the shafts 18 of the brushes, but are connected therewith through a pawl and ratchet mechanism to cause the brushes to rotate positively with the pinions in one direction and to remain at rest when the pinions turn in the opposite direction.

The significance of this arrangement is this: The brushes are intended to be positively operated only when the rack moves in one direction, i. e. from its extreme position shown in Fig. 1 toward the reciprocating device. The pawls 19 mounted upon the pinions and the ratchets 20 upon the shafts 18 are so related that during the return stroke of the racks the brushes 13 above the racks 3 revolve in clockwise direction while the brushes 13 below the racks 3 revolve in counter-clockwise direction, the arrangement being such that the lower portions of the upper brushes and the upper portion of the lower brushes move to the left or in a direction opposite to the direction of movement of the racks.

The leaves are fed at the left, with reference to Fig. 1. To facilitate the feeding, a table 21 may be provided. The leaves are placed upon the table and when the rack approaches its extreme position and the clutch mechanism opens up, the leaves are pushed toward the clutch mechanism. This pushing motion must be slightly continued until the clutch mechanism has closed.

The leaves are then drawn through the space intermediate the brushes and subjected on both sides to an abrading action.

When the clutch mechanism reaches the opposite end of the stroke, it automatically opens and what is left of the leaves is released and drops by gravity into collecting bins or other receptacles.

Figure 4:
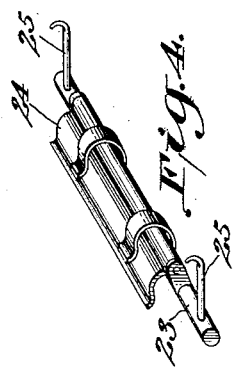
Fig. 4 is a perspective view of a modified form of a detail.

In Fig. 4 is shown a detachable clutch element. For purpose of illustration it is assumed to be similar to the clutch mechanism shown in Figs. 1-3. It consists of a roller-shaped element 23 and a movable curved leaf part 24 partly surrounding the roller so as to effect a tight grip of the leaves. The departure consists primarily in the provision of hooks 25 for attaching it to and detaching it from the rack structure which may for this purpose be provided with eyes (not shown). By this arrangement it is possible to clamp the leaves in the clutch mechanism and then attach the clutch mechanism to the racks. A plurality of clutch mechanism or holders may be continuously charged by cheap labor and the charged holders may then be attached, in rapid succession, to the racks. The arrangement may be such that the holders drop out from their point of attachment at the opposite end of the stroke.

In connection with the embodiment shown in Figs. 1-3 it is advantageous to use knives engaging both sides of the leaves to be cleaned to initially remove therefrom the major part of the matter to be removed. As shown in Fig. 3, the table 21 may support one knife or set of knives 27 to bear upon the under side of the leaves while knives 28 may be mounted on the support 1 to bear upon the upper face of the leaves.

In fact various auxiliary devices may be used in combination with the device described to bring about a complete cleaning action.

When leaves are to be cleaned without any previous chemical treatment, it is advisable to first crush in any suitable manner the outer tissues to make them more readily removable by the action of the revoluble cleaning devices or by the combined action of the knives 27, 28 and the revoluble cleaning devices.

It is also understood that various changes may be made within the scope of the invention. The clutch mechanism, the means for operating the clutch to receive and release the leaves or fibers may obviously be modified in numerous ways.

The nature and character of the cleaning devices may be changed to suit particular requirements.

I claim:

1. Apparatus for cleaning fibers comprising attrition devices constructed and arranged to yieldingly engage opposite sides of the fibers, clamping mechanism, means for reciprocating the clamping mechanism through the space intermediate the attrition devices, means operative to open the clamping mechanism at each end of the stroke and means operative to close the clamping mechanism intermediate the ends of the stroke.

2. Apparatus according to claim 1 in which the attrition devices consist of revolubly mounted brushes.

3. Apparatus according to claim 2 in which motion of the clamping mechanism is translated to revolve the brushes.

4. Apparatus according to claim 3 in which the translation of motion is effected by a rack connected with the clamping mechanism and by pinions connected with the brushes.

5. Apparatus according to claim 3 in which the relation between the clamping mechanism and the brushes is such that the brushes act upon the object in a direction opposite to the direction of movement thereof.

6. Apparatus for cleaning fibers, comprising parallel racks having teeth on their upper and lower edge, guides for said racks, means for reciprocating the racks, a clutch device connected to the ends of the racks, revolubly mounted cleaning devices disposed at opposite sides of the plane of motion of the clutch device and adapted to operate upon opposite sides of the fibers held by the clutch device and means intermediate the racks and the cleaning devices for revolving the latter during the return stroke of the rack mechanism, the arrangement being such that the opposing faces of the cleaning devices move in a direction opposite to the direction of movement of the racks.

In testimony whereof I affix my signature.

RAMON QUIJANO.